(12) United States Patent
Yamada et al.

(10) Patent No.: US 12,299,188 B2
(45) Date of Patent: May 13, 2025

(54) DISPLAY SYSTEM, CONTROL APPARATUS, AND CONTROL PROGRAM

(71) Applicant: SATO HOLDINGS KABUSHIKI KAISHA, Tokyo (JP)

(72) Inventors: Noriyasu Yamada, Tokyo (JP); Yasuhiro Misu, Tokyo (JP); Shogo Hara, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/265,947

(22) PCT Filed: Aug. 23, 2021

(86) PCT No.: PCT/JP2021/030706
§ 371 (c)(1),
(2) Date: Jun. 7, 2023

(87) PCT Pub. No.: WO2022/195913
PCT Pub. Date: Sep. 22, 2022

(65) Prior Publication Data
US 2024/0036635 A1    Feb. 1, 2024

(30) Foreign Application Priority Data

Mar. 16, 2021  (JP) ................. 2021-042072

(51) Int. Cl.
G06F 3/01      (2006.01)
G06Q 30/0601   (2023.01)
G06T 11/60     (2006.01)

(52) U.S. Cl.
CPC ......... *G06F 3/011* (2013.01); *G06Q 30/0639* (2013.01); *G06T 11/60* (2013.01)

(58) Field of Classification Search
CPC ...... G06F 3/011; G06Q 30/0639; G06T 11/60
See application file for complete search history.

(56) References Cited

U.S. PATENT DOCUMENTS 10,634,506 B2 *   4/2020  Hill ................. H04W 4/021
2015/0039458 A1 * 2/2015  Reid ................ A61B 5/117
                                                    705/26.1
(Continued)

FOREIGN PATENT DOCUMENTS

JP    H11-175597 A    7/1999
JP    2006-267057 A  10/2006
(Continued)

OTHER PUBLICATIONS

International Search Report issued in connection with PCT Appl. No. PCT/JP2021/030706 dated Nov. 9, 2021.
(Continued)

*Primary Examiner* — Kenneth Bukowski
(74) *Attorney, Agent, or Firm* — Foley & Lardner LLP

(57) ABSTRACT

A display system includes: a first apparatus that detects a position of a person in a space in which an object is located; a second apparatus that is different from the first apparatus and detects a position of the object; and a control apparatus that displays information on a display apparatus. The control apparatus integrates information acquired from the first apparatus and related to a change in the position of the person between a predetermined point of time and a point of time different from the predetermined point of time and information acquired from the second apparatus and related to a change in the position of the object between a predetermined point of time and a point of time different from the predetermined point of time and displays integrated information on a display apparatus.

12 Claims, 7 Drawing Sheets

(56) References Cited

U.S. PATENT DOCUMENTS

| | | | |
|---|---|---|---|
| 2017/0046771 A1* | 2/2017 | Cropp, Jr. | G06Q 30/0639 |
| 2017/0186022 A1* | 6/2017 | Miyagi | G06T 7/0004 |
| 2017/0278112 A1* | 9/2017 | Ikeda | G06Q 30/0201 |
| 2019/0188734 A1* | 6/2019 | Nagai | G06V 10/945 |
| 2019/0332855 A1* | 10/2019 | Taniguchi | G06V 40/70 |
| 2020/0049509 A1* | 2/2020 | Hill | G06Q 30/0259 |
| 2020/0118401 A1* | 4/2020 | Zalewski | G07G 1/0072 |
| 2022/0413608 A1* | 12/2022 | Grzesiak | G06F 3/14 |

FOREIGN PATENT DOCUMENTS

| | | | | |
|---|---|---|---|---|
| JP | 2007147300 A | * | 6/2007 | |
| JP | 2017-004112 A | | 1/2017 | |
| JP | 2018-151721 A | | 9/2018 | |
| JP | 2018-151963 A | | 9/2018 | |
| JP | 2019-109751 A | | 7/2019 | |
| WO | WO-2008120971 A1 | * | 10/2008 | G08B 25/016 |
| WO | WO-2022193416 A1 | * | 9/2022 | G06F 16/2462 |

OTHER PUBLICATIONS

Written Opinion of the International Searching Authority issued in connection with PCT Appl. No. PCT/JP2021/030706 dated Nov. 9, 2021.

Extended European Search Report issued in connection with EP Appl. No. 21931657.7 dated Feb. 27, 2024.

Office Action issued in Japanese Appl. No. 2021-042072 dated Oct. 8, 2024.

* cited by examiner

DISPLAY SYSTEM, CONTROL APPARATUS, AND CONTROL PROGRAM

TECHNICAL FIELD

The present disclosure relates to a display system, control apparatus, and control program for displaying position information.

BACKGROUND ART

Various positioning technologies for detecting a position have been developed. For example, a global positioning system (GPS) or a positioning scheme that uses wireless communication with a RFID communication tag have been available (see, for example, patent literature 1). Appropriate positioning technologies are employed depending on the purpose of usage, mode of usage, etc. of position information.
[Patent Literature 1] JP2006-267057

SUMMARY OF INVENTION

Technical Problem

We have realized that, if the only purpose is to understand the position of a person or an object, a particular positioning technology suited to the purpose may be employed, but, in the case of analyzing the position of a person or an object for the purpose of obtaining certain information, use of position information detected by a particular positioning technology alone will make the content and precision of analysis depend on the characteristic of that positioning technology.

An illustrative purpose of an aspect of the present invention is to improve a technology of analyzing position information.

Solution to Problem

A display system according to an aspect of the present invention includes: a first apparatus that detects a position of a person in a space in which an object is located; a second apparatus that is different from the first apparatus and detects a position of the object; and a control apparatus that displays information on a display apparatus. The control apparatus integrates information acquired from the first apparatus and related to a change in the position of the person between a predetermined point of time and a point of time different from the predetermined point of time and information acquired from the second apparatus and related to a change in the position of the object between a predetermined point of time and a point of time different from the predetermined point of time and displays integrated information on a display apparatus.

Advantageous Effects of Invention

According to an aspect of the present invention, the technology of analyzing position information can be improved.

DESCRIPTION OF EMBODIMENTS

Figure 1:
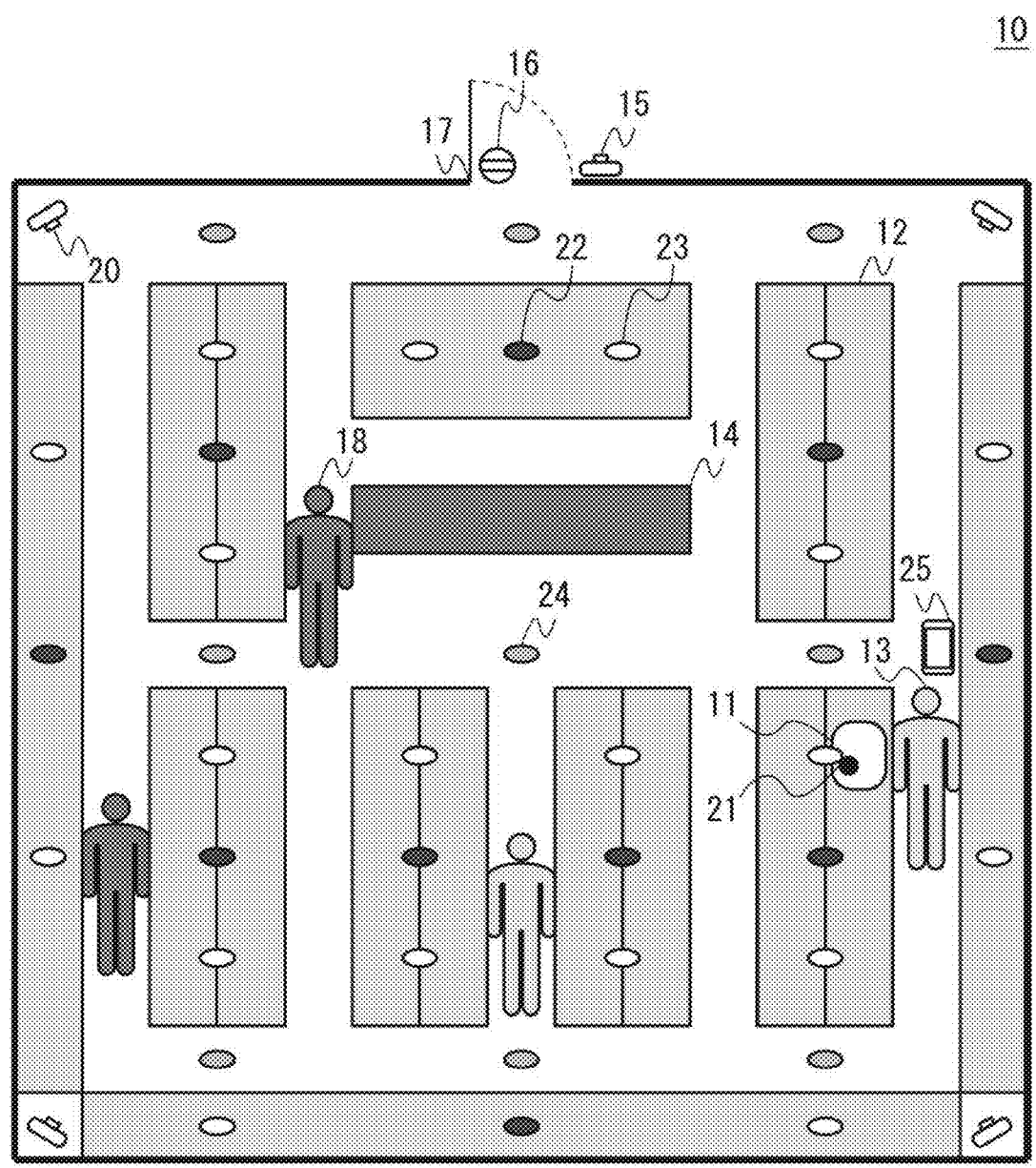
FIG. 1 shows an example of a retail shop subject to analysis by the analysis system according to the embodiment.

A description will be given of an embodiment of the present invention with reference to the drawings. The same numerals are used in the description to denote the same elements, and a duplicate description is omitted as appropriate.

A summary of the embodiment will be given. The analysis system of the embodiment acquires information indicating the position of a person and an object detected by multiple different positioning schemes in order to analyze the behavior of the person in response to the object located in a space subject to analysis. By analyzing position information detected by multiple positioning schemes in an integrated manner instead of relying on a single positioning scheme, information which cannot be detected by a given positioning scheme or for which the detection precision is low can be complemented by a further positioning scheme. Therefore, the range and precision of analysis can be improved.

When a position is detected by imaging a person or an object by using an imaging apparatus, for example, the status, action, etc. of the person or the object can also be recognized, but then detection is disabled when the person or the object enters a blind spot. Even in such a case, the position of the person or the object can be detected by using wireless communication technology such as Bluetooth (registered trademark) to detect the position of a communication tag held by the person or attached to the object.

In further accordance with the analysis system of the embodiment, analysis can be performed by allowing for, in addition to the information detected by a given positioning scheme, different information detected by a further positioning scheme. Therefore, knowledge that cannot be obtained only from the information detected by the single positioning scheme can be obtained. When it is detected that an object having a communication tag attached thereto is picked up by the hand of a person by referring to a change in the position in the position of the communication tag, for example, it is possible to recognize the action, facial expression, etc. of the person at that time by referring to a captured image. When it is detected that an object having a communication tag attached thereto is returned from the hand of the person to a rack by referring to a change in the position of the communication tag, it is possible to recognize the action, facial expression, etc. of the person before and after the action by referring to a captured image. Therefore, the willingness of a buyer to buy the product or the reason why the buyer did not buy the product can be analyzed.

An "object" in this case is inclusive of a facility, equipment, apparatus (also referred to as "facility" generically) as well as a product. A facility is inclusive of an "immovable" such as the ceiling, post, etc. in a building or a room or a "movable" such as the fixture, rack, desk, etc. arranged in a room. The analysis system of the embodiment can also analyze a situation in which a facility, a person, and an object are in or a relationship therebetween. For example, the system can analyze whether a "person" is or is not located near a "facility", whether a "product" is located or not located near a "facility", or the like.

As discussed, the analysis system of the embodiment can not only analyze the behavior of a person in response to an object with a precision higher than that of the related-art analysis technologies but also provide an analysis technology that makes it possible to obtain knowledge that cannot be obtained in the related-art analysis technologies.

Hereinafter, the embodiment will be described in detail by illustrating a case of analyzing the behavior of a buyer in response to a product in a retail shop in which products are on display and on sale.

FIG. 1 shows an example of a retail shop subject to analysis by the analysis system according to the embodiment. A retail shop 10 is provided with multiple display racks 12 for displaying a product 11, a cash register 14 for calculating the purchase of the product 11 bought by a buyer 13, a plurality of positioning devices for detecting the position of the product 11 or the buyer 13, an imaging apparatus 15 for imaging the buyer 13 visiting the retail shop 10, an identification apparatus 16 for identifying the buyer 13, and a display control apparatus 100 for integrating information related to the position of the buyer 13 and information related to the position of the product 11 detected by the multiple positioning devices and displaying the information on a display apparatus 19. The positioning device is inclusive of an imaging apparatus 20, a communication tag 21, an access point 22, a locator 23, a GPS apparatus 24, and a mobile terminal 25.

The imaging apparatus 20 is provided on the ceiling, wall, floor, the display rack 12 of the retail shop 10. An analysis apparatus 50 acquires the position of the product 11 and the buyer 13 from an image captured by the imaging apparatus 20. The analysis apparatus 50 may identify the buyer 13, recognize an action, facial expression, etc. of the buyer 13, or recognizing the status, etc. of the product 11 by analyzing the image captured by the imaging apparatus 20. The imaging apparatus 20 may have a ranging function. The imaging apparatus 20 may be installed to make it possible to image at least the upper part of the body of the buyer 13. The imaging apparatus 20 may be installed at a position and in an orientation to make it possible to image a buying behavior of the buyer 13 looking at, touching, of holding in hand the product 11.

The communication tag 21 is attached to the product 11. The communication tag 21 may be an RFID or a beacon. The communication tag 21 may also be provided with a sensor such as an acceleration sensor, a pressure sensor, and a temperature sensor capable of detecting various information. In this case, the analysis apparatus 50 can acquire the information detected by these sensors in addition to the position of the communication tag 21. The communication tag 21 may be in possession of the buyer 13.

The access point 22 is a wireless base station for wireless communication according to a standard such as Wi-Fi (registered trademark). The access point 22 is provided on the ceiling, wall, floor, the display rack 12, etc. of the retail shop 10. The access point 22 detects the position of the communication tag 21 by using a positioning technology based on a Wi-Fi signal. For example, a distance between the communication tag 21 and the access point 22 can be measured by measuring the radio field intensity of the Wi-Fi signal or measuring the propagation time of the Wi-Fi signal according to the time of flight (TOF) scheme. Further, the position of the communication tag 21 can be identified based on the principle of triangulation by measuring distances between multiple access points 22 located around the communication tag 21 and the communication tag 21.

The locator 23 is an apparatus for identifying the position of the communication tag 21 by using a beacon signal transmitted and received according to a standard such as Bluetooth and Bluetooth low energy (BLE). The locator 23 is provided on the ceiling, wall, floor, the display rack 12, etc. of the retail shop 10. For example, the locator 23 measures an angle of arrival (AOA) of a beacon signal transmitted from the communication tag 21 and identifies the position of the communication tag 21 based on the angle of arrival obtained. The locator 23 may transmit a beacon signal, and the communication tag 21 may identify the position of itself by receiving the beacon signal. The communication tag 21 may identify the position of itself based on beacon signals transmitted from multiple locators 23.

The GPS apparatus 24 identifies the position of itself by receiving a positioning signal in a satellite positioning system such as a global positioning system (GPS) and a global navigation satellite system (GNSS). The communication tag 21 acquires position information from the GPS apparatus 24 located around the communication tag 21 and identifies position of the GPS apparatus 24 as the position of the communication tag 21. The GPS apparatus 24 may transmit position information on the communication tag 21 to the analysis apparatus 50. The GPS apparatus 24 may be built in the communication tag 21.

The mobile terminal 25 is a smartphone, a tablet, etc. in possession of the buyer 13. The mobile terminal 25 acquires position information on itself by using an arbitrary scheme. The mobile terminal 25 may identify the position by using a Wi-Fi signal transmitted and received between the mobile terminal 25 and the access point 22, identify the position by using a beacon signal transmitted and received between the mobile terminal 25 and the locator 23, or identify the position by using a GPS function. The mobile terminal 25 may measure an angle of arrival (AOA) of the beacon signal transmitted from the communication tag 21, identify the position of the communication tag 21 based on the angle of arrival obtained, and transmit the position to the analysis apparatus 50. The mobile terminal 25 may acquire biological information detected by a sensor for detecting biological information on the buyer 13 and transmit the acquired information to the analysis apparatus 50.

The method of identifying the position of the product 11 and the buyer 13 is not limited to the one described above, and an arbitrary scheme may be used. An arbitrary positioning device that is not illustrated may be used. The position of the product 11 and the buyer 13 may be identified by combining multiple schemes. The position of the product 11 and the buyer 13 may be detected precisely by using the position information identified by the scheme(s) described above and other schemes in an integrated manner.

The imaging apparatus 15 is installed at an entrance 17 of the retail shop 10, captures an image of the buyer 13 visiting the retail shop 10 from the entrance 17, and transmits the captured image to the analysis apparatus 50. The analysis apparatus 50 tracks the buyer 13 in the image captured by the imaging apparatus 20 by using an image of the buyer 13 received from the imaging apparatus 15.

The identification apparatus 16 is installed at the entrance 17 of the retail shop 10, identifies the buyer 13 visiting the retail shop 10 from the entrance 17, and transmits identification information on the buyer 13 to the analysis apparatus 50. The identification apparatus 16 may identify the buyer 13 by using an authentication technology such as face authentication and biometric authentication, identify the buyer 13 by communicating with the mobile terminal 25 in possession of the buyer 13 and identifying the mobile terminal 25, identify the buyer 13 by acquiring information for identifying the buyer 13 from an IC card, point card, membership card, etc. in possession of the buyer 13, or identify the buyer 13 by using an optional alternative technology. The identification apparatus 16 may acquire information related to the buyer 13 from the mobile terminal, IC card, etc. and transmit the acquired information to the analysis apparatus 50. The analysis apparatus 50 uses the information on the buyer 13 received from the identification apparatus 16 for analysis.

The analysis apparatus 50 acquires the positions of the product 11 and the buyer 13 detected by multiple positioning devices, integrating the acquired positions to analyze the behavior of the buyer 13 in response to the product 11. The analysis apparatus 50 may be provided for each retail shop 10. Alternatively, the analysis apparatus may analyze the buying behavior of the buyer 13 in multiple retail shops 10 in an integrated manner.

The display control apparatus 100 integrates the information related to the positions of the product 11 and the buyer 13 detected by multiple positioning devices and displays the integrated information on the display apparatus 19. The display control apparatus 100 may display the information detected by multiple positioning devices on the display apparatus 19, superimposing the information. In this case, the display control apparatus 100 may acquire the information for display on the display apparatus 19 from the multiple positioning devices directly. The display control apparatus 100 may superimpose the result of analysis by the analysis apparatus 50 and the information detected by the multiple positioning devices on the display apparatus 19. In this case, the display control apparatus 100 may acquire the information for display on the display apparatus 19 from the analysis apparatus 50.

The analysis apparatus 50 and the display control apparatus 100 may be integrated in one apparatus, implemented separately in multiple apparatuses, or share some of the functions. One or both of the analysis apparatus 50 and the display control apparatus 100 may be implemented by a web server, etc. or implemented by using a cloud computing technology, etc.

Figure 2:
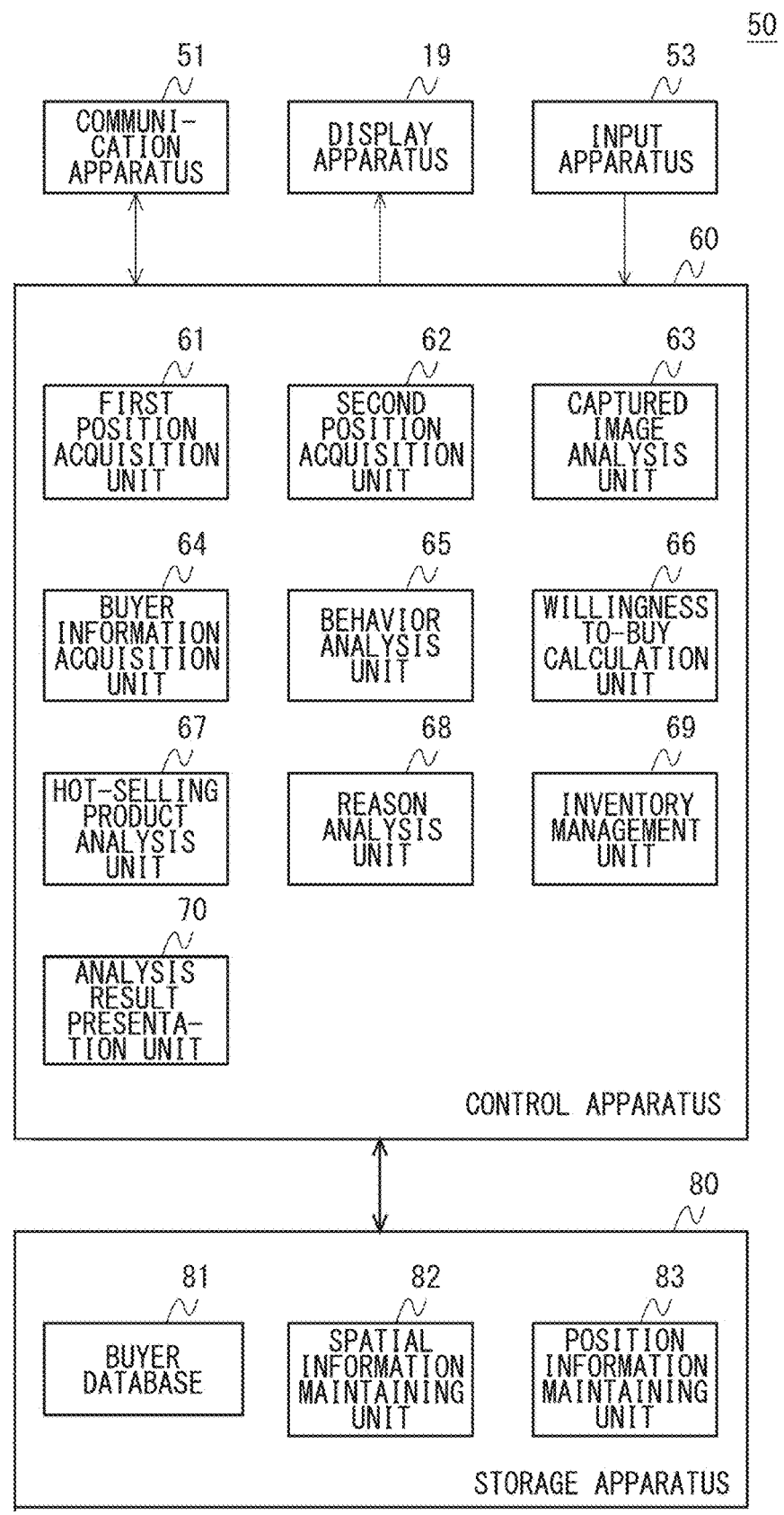
FIG. 2 is a block diagram schematically showing a function and a configuration of the analysis apparatus according to the embodiment.

FIG. 2 is a block diagram schematically showing a function and a configuration of the analysis apparatus 50 according to the embodiment. The analysis apparatus 50 is provided with a communication apparatus 51, a display apparatus 19, an input apparatus 53, a control apparatus 60, and a storage apparatus 80. The analysis apparatus 50 may be a server apparatus or an apparatus such as a personal computer or a mobile terminal such as a cellular phone terminal, a smartphone, and a tablet terminal.

The communication apparatus 51 communicates with the apparatus or the positioning device installed in the retail shop 10. The communication apparatus 51 may transmit and receive data by using an arbitrary wired or wireless communication technology.

The display apparatus 19 displays a screen generated by the control apparatus 60. The display apparatus 19 may be a liquid crystal display apparatus, an organic EL display apparatus, etc. The input apparatus 53 transmits a user input for instruction from a user of the analysis apparatus 50 to the control apparatus 60. The input apparatus 53 may be a mouse, a keyboard, a touch pad, etc. The display apparatus 19 and the input apparatus 53 may be implemented as a touch panel.

The storage apparatus 80 stores a program, data, etc. used by the control apparatus 60. The storage apparatus 80 may be a semiconductor memory, a hard disk, etc. The storage apparatus 80 is provided with a buyer database 81, a spatial information maintaining unit 82, a position information maintaining unit 83.

The buyer database 81 stores information related to the buyer 13. The buyer database 81 stores the buyer's 13 attribute information such as the name, age, sex, and address, preference information, and history of purchase of the product 11 in the retail shop 10.

The spatial information maintaining unit 82 stores information related to the space in the retail shop 10. The spatial information maintaining unit 82 stores a map of the display rack 12, etc. in the retail shop 10, the type and position of installation of the positioning device, etc.

The position information maintaining unit 83 stores the position information on the buyer 13 and the product 11 acquired from the positioning device. The position information maintaining unit 83 stores a history of the position information on the buyer 13 and the product 11, additional information such as acceleration, temperature, and pressure detected by the positioning device, etc.

The control apparatus 60 is provided with a first position acquisition unit 61, a second position acquisition unit 62, a captured image analysis unit 63, a buyer information acquisition unit 64, a behavior analysis unit 65, a willingness-to-buy calculation unit 66, a hot-selling product analysis unit 67, a reason analysis unit 68, an inventory management unit 69, and an analysis result presentation unit 70.

The functional blocks shown in the embodiment are implemented in hardware such as devices and mechanical apparatus exemplified by a CPU and a memory of a computer, and in software such as a computer program. FIG. 1 depicts functional blocks implemented by the cooperation of these elements. Therefore, it will be understood by those skilled in the art that these functional blocks are implemented in a variety of manners by a combination of hardware and software.

The first position acquisition unit 61 acquires the position of the buyer 13 in the retail shop 10. The first position acquisition unit 61 may receive information indicating the position of the buyer 13 directly from the positioning device installed in the retail shop 10. Alternatively, the first position acquisition unit 61 may receive information indicating the position of the buyer 13 from a retail shop server (not shown) installed in the retail shop 10 to aggregate the information detected by the positioning devices.

The second position acquisition unit 62 acquires the position of the product 11 in the retail shop 10. The second position acquisition unit 62 may receive information indicating the position of the product 11 directly from the positioning device installed in the retail shop 10. Alternatively, the second position acquisition unit 62 may receive information indicating the position of the buyer 13 from a retail shop server (not shown).

The first position acquisition unit 61 or the second position acquisition unit 62 may acquire information such as acceleration, temperature, and pressure detected by the positioning device in addition to the position information on the buyer 13 or the product 11.

The captured image analysis unit 63 analyzes a captured image acquired from the imaging apparatus 20 to acquire the position of the product 11 or the buyer 13. The captured image analysis unit 63 may use an image of the buyer 13 acquired from the imaging apparatus 15 to detect the buyer 13 from the captured image. The captured image analysis unit 63 may use an image of the product 11 maintained in the storage apparatus 80 in advance to detect the product 11 from the captured image. The captured image analysis unit 63 may use an image of the display rack 12, etc. in the retail ship maintained in the storage apparatus 80 in advance to identify the position of the buyer 13 or the product 11 included in the captured image.

The captured image analysis unit 63 may monitor the movement of the buyer 13, excluding persons other than the buyer 13. The persons other than the buyer 13 are, for example, the employees of the retail shop 10 and the contractors visiting the retail shop 10. The captured image analysis unit 63 may exclude them from analysis by using images of the employees and contractors of the retail shop 10 maintained in the storage apparatus 80 in advance and detecting the employees and contractors in the captured image. This can improve the precision of analysis.

The buyer information acquisition unit 64 acquires information related to the buyer 13. The buyer information acquisition unit 64 acquires the identification information on the buyer 13 from the identification apparatus 16 and acquires the information such as attribute and purchase history of the buyer 13 by referring to the buyer database 81. The buyer information acquisition unit 64 may acquire the information related to the buyer 13 from the identification apparatus 16 or the mobile terminal 25.

The behavior analysis unit 65 analyzes the behavior of the buyer 13 in response to the product 11 based on the relationship between the position of the buyer 13 acquired by the first position acquisition unit 61 and the position of the product 11 acquired by the second position acquisition unit 62. The behavior of the buyer 13 is exemplified by taking interest in the product 11, looking at the product 11, touching the product 11, picking up the product 11, considering buying the product 11, returning the product 11 to the display rack 12, bringing the product 11 to the cash register 14, and buying the product 11.

The willingness-to-buy calculation unit 66 calculates an evaluation score that quantifies the willingness of the buyer 13 to buy the product 11, based on the buying behavior of the buyer 13 analyzed by the behavior analysis unit 65 by associating the position of the product 11 and the position of the buyer 13. The willingness-to-buy calculation unit 66 increases the evaluation score of the product 11 when the buyer 13 takes interest in the product 11, considers buying the product 11, or looks at, picks up, or buys the product 11. The larger the number of times or longer the period of time that the buyer 13 looks at or picks up the product 11, the higher the evaluation score of the product 11 calculated by the willingness-to-buy calculation unit 66 may be. The longer the period of time that the buyer 13 does not take interest in, looks at, or picks up the product 11, the lower the evaluation score of the product 11 calculated by the willingness-to-buy calculation unit 66 may be. The willingness-to-buy calculation unit 66 may calculate the evaluation score evaluating the willingness of the buyer 13 to buy the product 11 based on biological information on the buyer 13 identified when the buyer 13 looks at, picks up, or buys the product 11. For example, the evaluation score of the product 11 may be high in the case the pulse, body temperature, blood pressure, etc. of the buyer 13 increases when the buyer 13 looks at, picks up, or buys the product 11.

The hot-selling product analysis unit 67 analyzes, of those products 11 on display in the retail shop 10, the product 11 that is selling hot, based on the buying behavior of the buyer 13 analyzed by the behavior analysis unit 65, the evaluation score evaluating the willingness to buy the product 11 calculated by the willingness-to-buy calculation unit 66, etc. The hot-selling product analysis unit 67 may identify the product picked up by the buyer 13 and then directly bought without being returned to the display rack 12 as a hot-selling product. The hot-selling product analysis unit 67 may identify the product for which the time elapsed since it was picked up by the buyer 13 until it is moved to the cash register 14 is shorter than a predetermined value as a hot-selling product. The hot-selling product analysis unit 67 may identify the product picked by the buyer 13 not so frequently as a niche product. The hot-selling product analysis unit 67 may identify the product picked up by the buyer 13 and then returned to the display rack 12 frequently as a candidate of the hot-selling product. By analyzing the hot-selling product, improvement can be made in purchase of stock, display position, etc. of the product 11. Further, feedback of the information on the analyzed hot-selling product to the manufacturer of the product 11 can be exploited in the development and sales strategy of the product 11.

The reason analysis unit 68 analyzes the reason that the buyer 13 did not buy the product 11 based on the buying behavior of the buyer 13 analyzed by the behavior analysis unit 65, etc. The reason analysis unit 68 may analyze the reason that the buyer 13 did not buy the product 11 by analyzing the behavior of the buyer 13 before and after the buyer 13 looked at or picked up the product 11. When the buyer 13 looked at a tag such as a price tag attached to the product 11 and then returned the product 11 to the display rack 12, for example, the reason analysis unit 68 may estimate that the price, material, brand, etc. of the product 11 did not suit the preference of the buyer 13. When the buyer 13 touched the product 11 and then returned the product 11 to the display rack 12, the reason analysis unit 68 may estimate that the feel of the texture of the product 11 did not suit the preference of the buyer 13. When buyer 13 unfolded the folded product 11 and then returned the product 11 to the display rack 12, the reason analysis unit 68 may estimate that the design, size, etc. of the product 11 did not suit the preference of the buyer 13. By analyzing the reason that the buyer 13 did not buy the product 11, improvement can be made in the purchase of stock, display position, etc. of the product 11. Further, feedback of the analyzed to the manufacturer of the product 11 can be exploited in the development and sales strategy of the product 11.

Analysis by the behavior analysis unit 65, the willingness-to-buy calculation unit 66, the hot-selling product analysis unit 67, or the reason analysis unit 68 may be performed in units of attributes of the buyer 13. For example, analysis may be performed in units of sex, age, place of residence, etc. of the buyer 13. This makes it possible to analyze what buyer segment took interest in the product, what product attracted interest, what product was picked up, etc.

The inventory management unit 69 manages the inventory of the retail shop 10. The inventory management unit 69 manages the quantity in stock and the display position of the product 11 based on the position information on the product 11 acquired by the second position acquisition unit 62, the buying behavior of the buyer 13 analyzed by the behavior analysis unit 65, etc. The inventory management unit 69 may automatically order the product 11 bought by the buyer 13 and for which the quantity in stock has been reduced. The inventory management unit 69 may increase or decrease the number of the products 11 ordered or change the display position of the product 11 based on the result of analysis by the hot-selling product analysis unit 67 or the reason analysis unit 68.

The analysis result presentation unit 70 displays the result of analysis by the behavior analysis unit 65, the willingness-to-buy calculation unit 66, the hot-selling product analysis unit 67, or the reason analysis unit 68 on the display apparatus 19.

A description will be given of a specific example of analysis of the buying behavior of the buyer 13 by the behavior analysis unit 65.

Figure 3A:
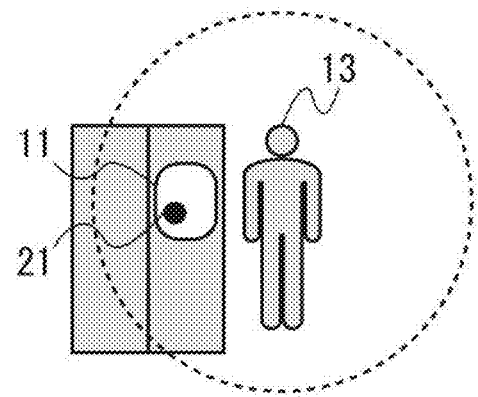
FIGS. 3A, 3B, and 3C show examples of the relationship between the position of the buyer and the position of the product.
Figure 3B:
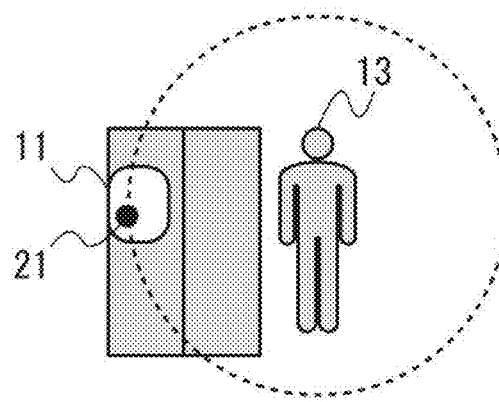
Figure 3C:
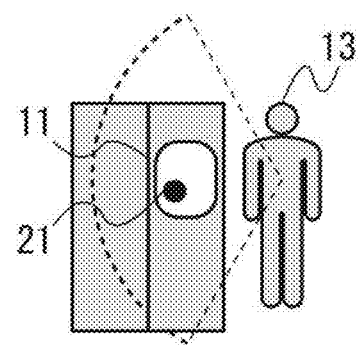

The behavior analysis unit 65 analyzes the behavior of the buyer 13 in response to the product 11 based on the relationship between the position of the buyer 13 and the position of the product 11. FIGS. 3A, 3B, and 3C show examples of the relationship between the position of the buyer 13 and the position of the product 11. The behavior analysis unit 65 may determine that the buyer 13 took interest in the product 11 when the buyer 13 and the product 11 are positioned in a predetermined relationship. As shown in FIG. 3A, for example, the behavior analysis unit 65 may determine that the buyer 13 took interest in the product 11 when the buyer 13 is in a predetermined range from the product 11 in a passageway facing the display rack 12 on which the product 11 is on display. The behavior analysis unit 65 may not determine that the buyer 13 took interest in the product 11 when the buyer 13 is within a predetermined range from the product 11 but, as shown in FIG. 3B, the buyer 13 is at a position that is not in a passageway facing the display rack 12 because the product 11 cannot be seen from the buyer 13. When the gazing direction of the buyer 13 can be acquired from an image capturing the buyer 13, the behavior analysis unit 65 may determine that the buyer 13 took interest in the product 11 when the product 11 is in the field of view of the buyer 13 as shown in FIG. 3C. The behavior analysis unit 65 may analyze the buying behavior of the buyer 13 by referring to a map of an area in the retail shop 10 stored in a spatial information maintaining unit 72.

The behavior analysis unit 65 may analyze the buying behavior of the buyer 13 based on a temporal change in the position of the buyer 13 or the product 11. The temporal change in the position comprises, for example, the position of the buyer 13 or the product 11 at a predetermined point of time, the amount of movement, number of times of movement, or route of movement of the buyer 13 or the product 11, the position of stay, duration of stay, or number of times of stay of the buyer 13, or the duration in which the product 11 is on display in the display rack 12. The behavior analysis unit 65 may determine that the product 11 is picked up by the buyer 13 when the amount of movement or the number of times of movement of the product 11 is large. The behavior analysis unit 65 may determine that the buyer 13 does not take interest in the product 11 when the duration in which the product 11 is on display in the display rack 12 is long. The behavior analysis unit 65 may determine that the buyer 13 took interest in the product 11 strongly when the duration or the number of times of stay of the buyer 13 near the product 11 is large.

The behavior analysis unit 65 may analyze the buying behavior of the buyer 13 based on a relative distance between the position of the buyer 13 and the position of the product 11. The behavior analysis unit 65 may calculate a distance between the position of the buyer 13 and the position of the product 11 and determine that the buyer 13 took interest in the product 11 within a predetermined range from the position of the buyer 13 that can be reached by the buyer 13.

The behavior analysis unit 65 may analyze the buying behavior of the buyer 13 based on a change in the relative distance from the position of the buyer 13 to the position of the product 11 between a predetermined point of time and a point of time different from the predetermined point of time. The behavior analysis unit 65 may determine that the buyer 13 picked up the product 11 when the distance between the buyer 13 and the product 11 has decreased. The behavior analysis unit 65 may determine that the buyer 13 returned the product to the display rack 12 when the distance between the buyer 13 and the product 11 has increased. The behavior analysis unit 65 may analyze the buying behavior of the buyer 13 based on a speed of change in the relative distance between the position of the buyer 13 and position of the product 11. The behavior analysis unit 65 may determine that the buyer 13 took strong interest in the product 11 when the speed with which the buyer 13 picked up the product 11 is large. When the speed with which the product 11 is returned to the display rack 12 is relatively high, the behavior analysis unit 65 may determine that the interest level shown when the buyer 13 picked up the product 11 is relatively low.

The behavior analysis unit 65 may analyze the buying behavior of the buyer 13 based on a change in the height of the product 11 detected in a predetermined range around the buyer 13. The behavior analysis unit 65 may determine that the product 11 is picked up by the buyer 13 when the height of the product 11 in a range that can be reached by the buyer 13 has changed.

The behavior analysis unit 65 may analyze the behavior of the buyer 13 based on information indicating that the buyer 13 touched the product 11 or held the product 11. That the buyer 13 touched the product 11 or held the product 11 can be detected by, for example, analyzing an image captured by the imaging apparatus 20. Alternatively, that the buyer 13 touched the product 11 or held the product 11 can be detected by providing the communication tag 21 attached to the product 11 with an acceleration sensor, a contact sensor, a pressure sensor, etc.

Figure 4:
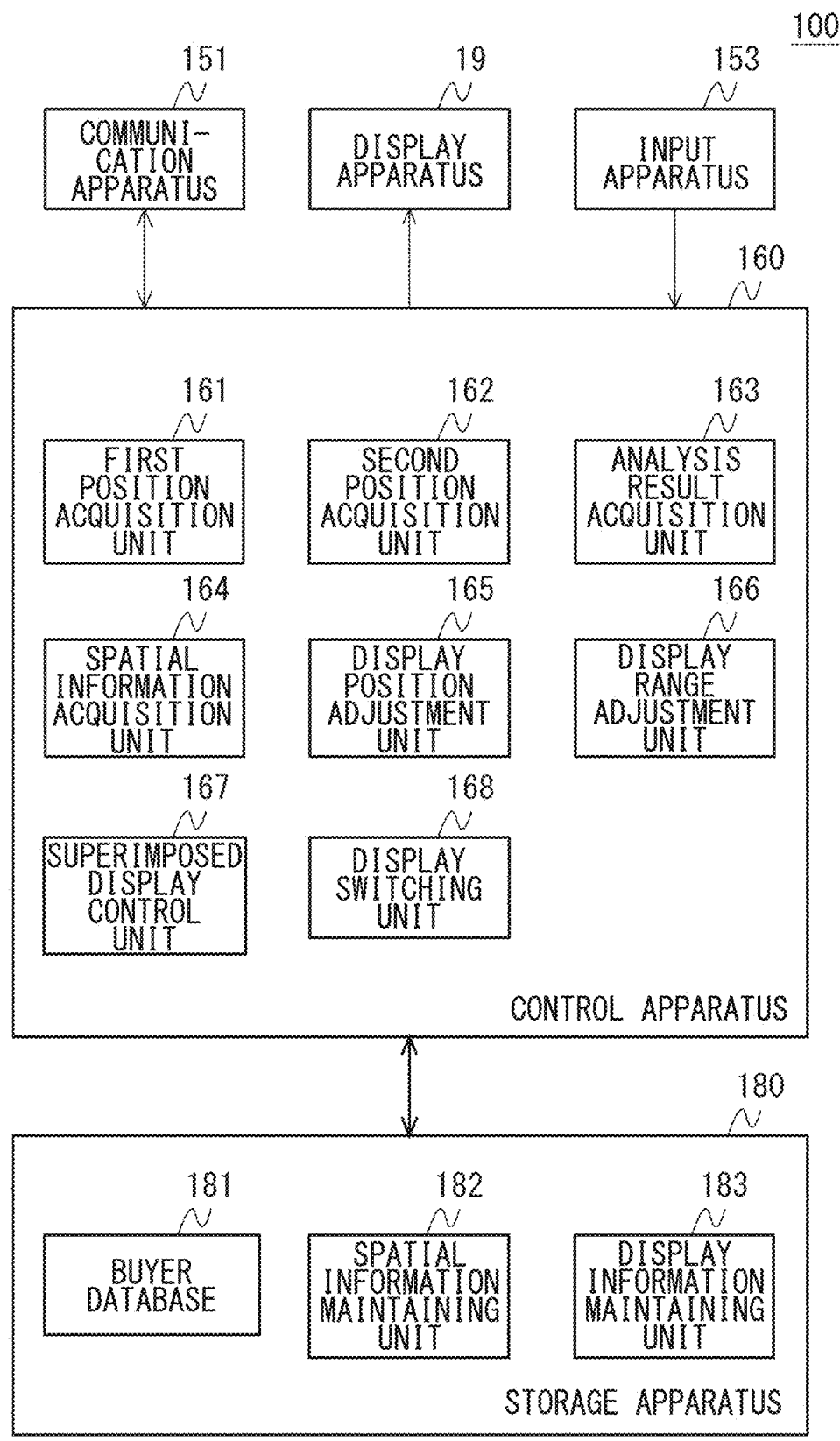
FIG. 4 is a block diagram schematically showing a function and a configuration of the display control apparatus according to the embodiment.

FIG. 4 is a block diagram schematically showing a function and a configuration of the display control apparatus 100 according to the embodiment. The display control apparatus 100 is provided with a communication apparatus 151, a display apparatus 19, an input apparatus 153, a control apparatus 160, and a storage apparatus 180. The display control apparatus 100 may be a server apparatus, or an apparatus such as a personal computer, or a mobile terminal such as a cellular phone terminal, a smartphone, and a tablet terminal.

The communication apparatus 151 communicates with an apparatus such as a positioning device or the analysis apparatus 50 installed in the retail shop 10. The communication apparatus 151 may transmit and receive data by using an arbitrary wired or wireless communication technology.

The input apparatus 153 transmits a user input for instruction from a user of the display control apparatus 100 to the control apparatus 160. The input apparatus 153 may be a mouse, a keyboard, a touch pad, etc. The display apparatus 19 and the input apparatus 153 may be implemented as a touch panel.

The storage apparatus 180 stores a program, data, etc. used by the control apparatus 160. The storage apparatus 180 may be a semiconductor memory, a hard disk, etc. The storage apparatus 180 is provided with a buyer database 181, a spatial information maintaining unit 182, a display information maintaining unit 183.

The buyer database 181 stores information related to the buyer 13. The buyer database 181 stores the buyer's 13 attribute information such as the name, age, sex, and address, preference information, history of purchase of the product 11 in the retail shop 10.

The spatial information maintaining unit 182 stores information related to the space in the retail shop 10. The spatial information maintaining unit 182 stores a map of the display rack 12, etc., the type, position of installation, layout of the positioning device, etc. in the retail shop 10.

The display information maintaining unit 183 stores information displayed on the display apparatus 19 such as the position information on the buyer 13 and the product 11 acquired from the positioning device, the result of analysis by the analysis apparatus 50, etc. The display information maintaining unit 183 stores a history of the position information on the buyer 13 and the product 11, additional information such as acceleration, temperature, and pressure detected by the positioning device, the result of analysis acquired from the analysis apparatus 50, etc.

The control apparatus 160 is provided with a first position acquisition unit 161, a second position acquisition unit 162, an analysis result acquisition unit 163, a spatial information acquisition unit 164, a display position adjustment unit 165, a display range adjustment unit 166, a superimposed display control unit 167, and a display switching unit 168. These functional blocks are also implemented in a variety of manners by a combination of hardware and software.

The first position acquisition unit 161 acquires the position of the buyer 13 in the retail shop 10. The first position acquisition unit 161 may receive information indicating the position of the buyer 13 directly from the positioning device installed in the retail shop 10. Alternatively, the first position acquisition unit 161 may receive information indicating the position of the buyer 13 from a retail shop server (not shown) installed in the retail shop 10 to aggregate the information detected by the positioning devices or from the analysis apparatus 50.

The second position acquisition unit 162 acquires the position of the product 11 in the retail shop 10. The second position acquisition unit 62 may receive information indicating the position of the product 11 directly from the positioning device installed in the retail shop 10. Alternatively, the second position acquisition unit 162 may receive information indicating the position of the buyer 13 from a retail shop server (not shown) or the analysis apparatus 50.

The first position acquisition unit 161 or the second position acquisition unit 162 may acquire information such as acceleration, temperature, and pressure detected by the positioning device in addition to the position information on the buyer 13 or the product 11.

The analysis result acquisition unit 163 acquires the result of analysis by the analysis apparatus 50 from the analysis apparatus 50.

The display information displayed by the display control apparatus 100 on the display apparatus 19 comprises, integrated therein, information related to a change in the position of the buyer 13 between a predetermined point of time and a point of time different from the predetermined point of time and information related to a change in the position of the product 11 between a predetermined point of time and a point of time different from the predetermined point of time. The display information may comprise, integrated therein, information related to a change in the relative distance from the position of the buyer 13 to the position of the product 11 between a predetermined point of time and a point of time different from the predetermined point of time. More specifically, the display information may comprise the amount of movement, number of times of movement, speed of movement, duration of stay, or number of times of stay of the buyer 13 or the amount of movement, number of times of movement, speed of movement, or duration of existence of the product 11. The duration of stay and the number of times of stay may be the duration and the number of times of stay of the buyer 13 near the product 11, or the duration and the number of times of stay of the buyer 13 in the retail shop 10, or the duration of stay and the number of times of stay of the buyer 13 in each area in the retail shop 10.

The display information may further include the status, attribute, or behavior of the buyer 13. The display information may include, for example, the physical condition, mental condition, facial expression, and sign of the buyer 13, the buying behavior of the buyer 13 analyzed by the analysis apparatus 50, etc. The display information may comprise, integrated therein, the coordinates, map, or layout of the retail shop 10, information related to a change in the position of the buyer 13, and information related to a change in the position of the product 11. The display information may further include information related to the space in the retail shop 10. The information related to the space may comprise, for example, information related to an air-conditioning facility, a lighting facility, an acoustic facility, a door way, etc. installed in the retail shop 10 and information such as temperature, humidity, and brightness in the retail shop 10.

The spatial information acquisition unit 164 acquires information related to the space in the retail shop 10. The spatial information acquisition unit 164 may acquire the spatial information from a retail shop server (not shown) or the analysis apparatus 50 or acquire the spatial information via the input apparatus 153.

The display position adjustment unit 165 adjusts the display information of the respective display information to superimpose and display information such as the information detected by multiple positioning devices. The display range adjustment unit 166 adjusts the display range, scale, etc. of the respective display information to superimpose and display information such as the information detected by multiple positioning devices. The superimposed display control unit 167 superimposes and displays the display information adjusted by the display position adjustment unit 165 and the display range adjustment unit 166 on the display apparatus 19.

The display switching unit 168 is configured to switch between ON and OFF by displaying or not displaying at least one of multiple items of information superimposed and displayed on the display apparatus 19. The display switching unit 168 may superimpose and display changes in all items of information obtained on the display apparatus 19 simultaneously. The display switching unit 168 may display, of the multiple items of information obtained, some items and not display the rest. The display switching unit 168 may switch the content or display layout of the display information displayed on the display apparatus 19.

Figure 5:
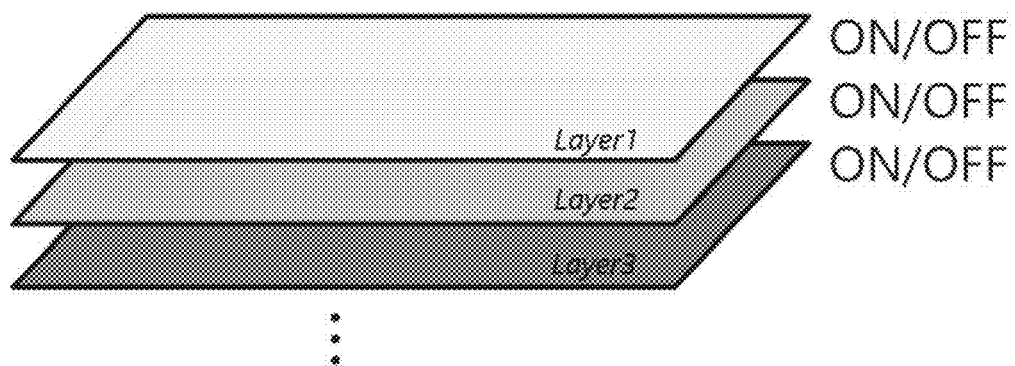
FIG. 5 schematically shows an example of a display screen displayed by the display control apparatus on the display apparatus.

FIG. 5 schematically shows an example of a display screen displayed by the display control apparatus 100 on the display apparatus 19. For example, the superimposed display control unit 167 i) displays information detected by the first positioning device and the result of analysis obtained by analyzing the information detected by the first positioning device on layer 1, ii) displays information detected by the second positioning device and the result of analysis obtained by analyzing the information detected by the second positioning device on layer 2, and iii) displays information detected by the third positioning device and the result of analysis obtained by analyzing the information detected by the third positioning device on layer 3. The display switching unit 168 receives an instruction to turn each layer on or off via the input apparatus 153 and turns each layer on or off in a switchable manner in accordance with the instruction.

Figure 6A:
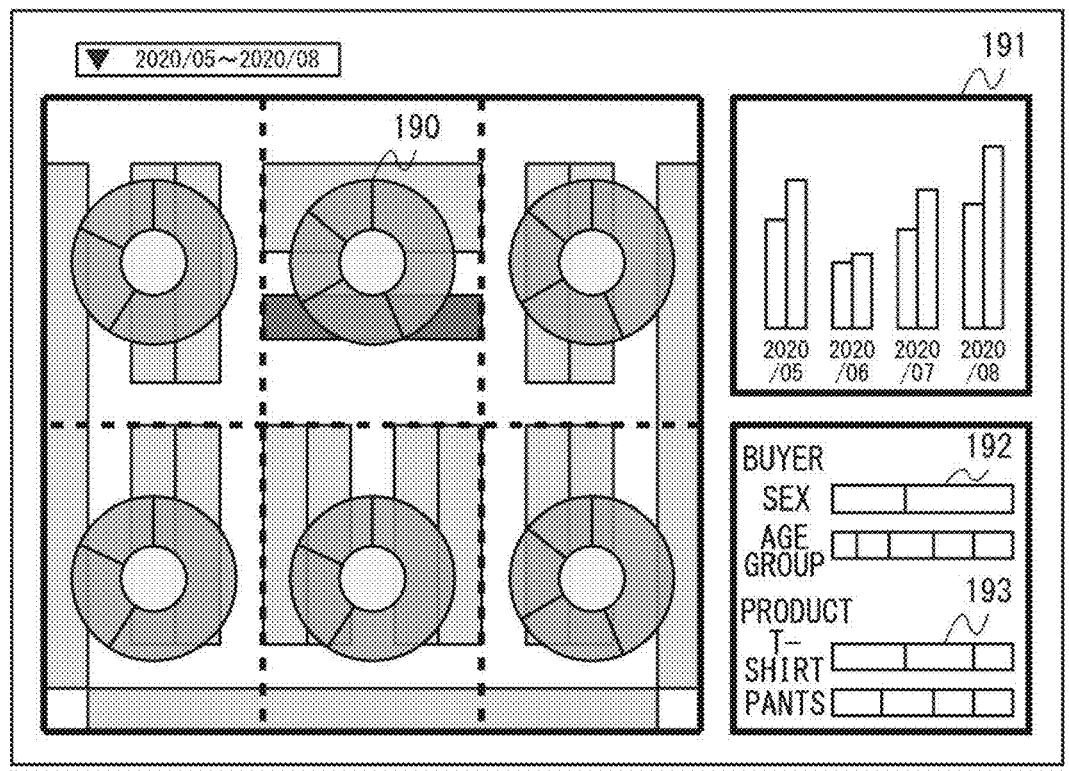
FIGS. 6A and 6B show examples of the display screen displayed by the display control apparatus on the display apparatus.
Figure 6B:
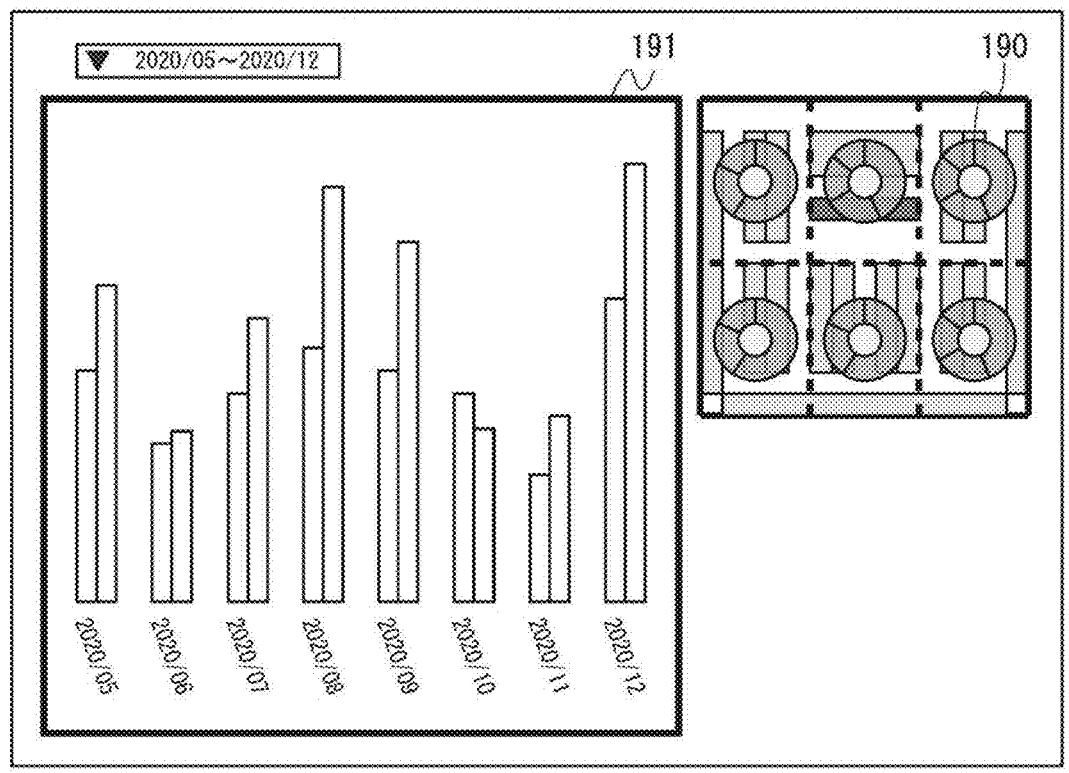

FIGS. 6A and 6B show examples of the display screen displayed by the display control apparatus 100 on the display apparatus 19. In the example shown in FIG. 6A, a graph 190 aggregating the amount of movement of the buyer 13 and the product 11 area by area is displayed superimposed on the map of the retail shop 10. Further, a graph 191 aggregating the amount of movement of the buyer 13 and the product 11 month by month, a graph 192 showing a sex and age distribution of the buyer 13, and a graph 193 aggregating, across the categories of the product 11, the proportion of the amount of movement of multiple products 11 included in each category. The analyzer can refer to the display screen shown in FIG. 6A to analyze the hot-selling product across attributes of the buyer 13, review the layout in the retail shop 10, or review the situation of inventory or purchase of stock.

In the example shown in FIG. 6B, the graph 191 aggregating the amount of movement of the buyer 13 and the product 11 month by month is shown on an enlarged scale, and the graph 190 aggregating the amount of movement of the buyer 13 and the product 11 area by area is displayed on a reduced scale. The display switching unit 168 switches the content or display layout of the display information displayed on the display screen in accordance with an instruction from the analyzer. This can support analysis by the analyzer properly.

Figure 7A:
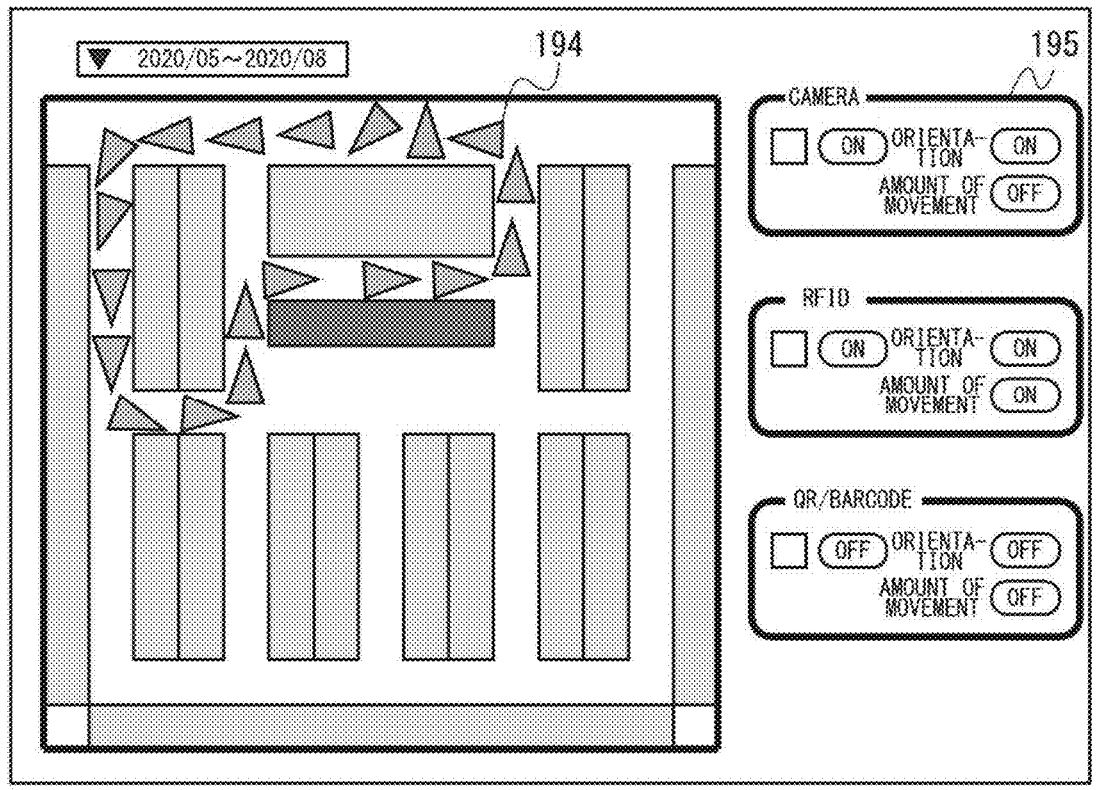
FIGS. 7A and 7B show examples of the display screen displayed by the display control apparatus on the display apparatus.
Figure 7B:
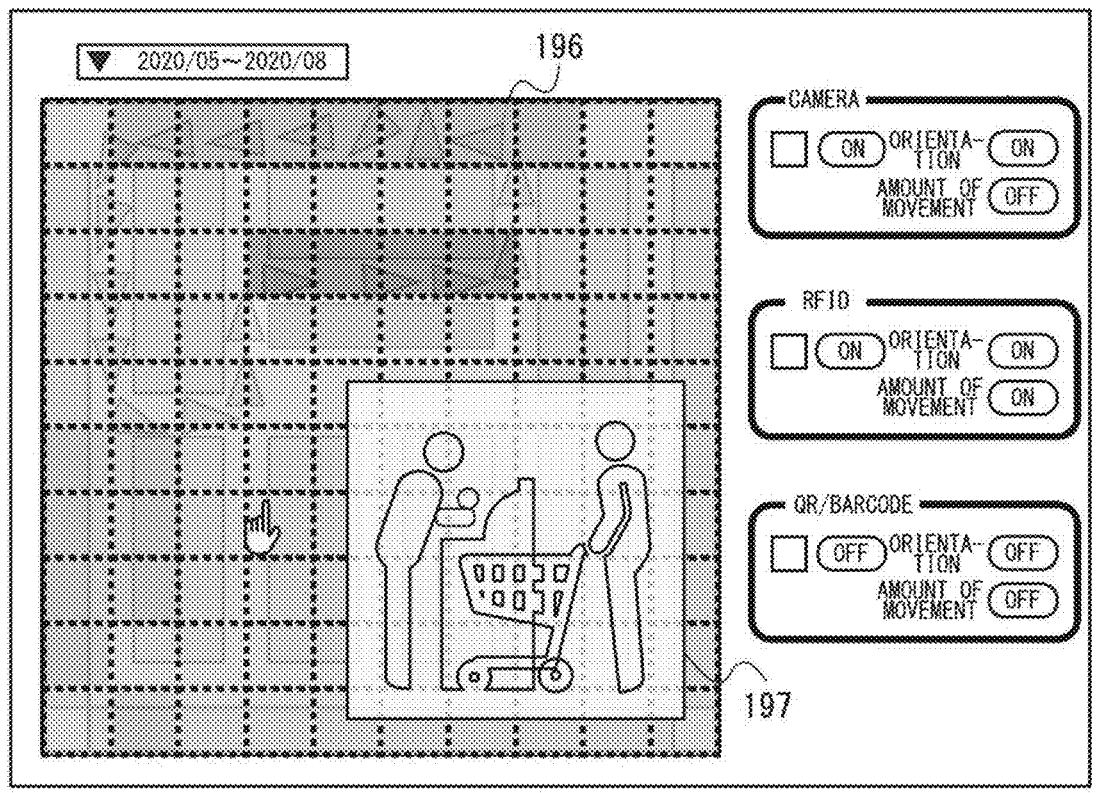

FIGS. 7A and 7B show examples of the display screen displayed by the display control apparatus 100 on the display apparatus 19. In the example shown in FIG. 7A, a movement locus 194 of the buyer 13 is displayed superimposed on the map of an area in the retail shop 10. Further, a user interface 195 for turning on or off the display of the information detected by multiple positioning devices and the analysis result in a switchable manner is displayed. The analyzer can turn on or off the display for each positioning device in a switchable manner via the user interface 195.

In the example shown in FIG. 7B, an analysis result 196 derived from aggregating the amount of movement of the buyer 13 and the product 11 area by area and a captured image 197 at the position designated by the analyzer are displayed superimposed on the display screen shown in FIG. 7A. The analyzer can superimpose the information detected by multiple positioning devices and the analysis result as desired in a switchable manner and so can obtain new knowledge by analyzing the information from many directions.

By way of one example of the display content displayed in the display screen, added value information such as event information for tasting events, bargains, etc. may further be superimposed. This enables the analyzer to perform various analysis related to the buyer and the product.

In the example given above, a description is given of a case where information related to a change in the position of a person and information related to a change in the position of an object are superimposed. Analytical values not available in the related art can be provided also by superimposing information related to a change in the position of a person and further information related to a change in the position of a person or by superimposing information related to a change in the position of an object and information related to a change in the position of a further object. For example, it is possible to analyze correlation between an arrangement of a product and how actively the product is selling by superimposing the position information, amount of movement, etc. of product A and product B having a commonality. More specifically, it is possible to analyze whether an arrangement of an expensive product beside an inexpensive product makes it more likely that the expensive product is selected, whether the amount of movement is increased due to a synergistic effect when products in the same price range are arranged side by side, etc. Moreover, the embodiment can be applied to optimization of the shop layout by superimposing the position information, amount of movement, etc. of the facility and the product. More specifically, it is possible to analyze whether products near a full-length glass generate a larger amount of movement, a difference in the amount of movement between product A hung in a hanger rack and product B put in the rack, etc.

Described above is an explanation based on an exemplary embodiment. The present invention is not limited to the embodiments described above, and it will be understood by those skilled in the art that various design changes are possible and various modifications are possible and that such modifications are also within the scope of the present invention.

In the embodiment described above, an example is shown where the buying behavior of the buyer 13 in the retail shop 10 is analyzed, but the technology of the embodiment can equally be used to analyze the packing work of a worker in a warehouse or to analyze the work of an employee in a factory. For example, it is possible to manage the quantity of production or production quality of a product or to analyze a cause for a decrease in the quantity of production or production quality, by displaying information such as the amount of movement of a worker acquired from an image captured by an imaging apparatus, the quantity of production of a product, superimposed on information such as the position of the product and the facility acquired from a communication tag attached to the product, facility, etc. and the contents in a package. When there is a decrease in the quantity of production or production quality, a failure in the equipment or facility is estimated to be the cause if the worker is actively moving in the packing or shipping process, and bad health of the worker is estimated to be the case if the amount of movement of the worker has decreased. A more in-depth cause may be analyzed by further analyzing information acquired from a sensor for detecting the body temperature, blood pressure, heart rate, etc. or information such as the action of the worker in the work imaged by the imaging apparatus.

In the embodiment described above, various functions provided by the analysis apparatus 50 and the relationship between the various functions have been described by referring to the illustrative functional blocks. The boundaries of the functional blocks described above are arbitrarily defined for convenience of description. Alternative boundaries different from those of the above-described functional blocks may be defined so long as the various functions and the relationship between the various functions are properly realized. The various functions provided by the analysis apparatus 50 may be realized by a single server apparatus or by coordination of multiple server apparatuses. Therefore, that a particular server provides a particular function is inclusive of a case where a particular function is realized by a single server apparatus and a case where a particular function is realized by multiple server apparatuses and does not necessarily mean that a particular function should be realized solely by a particular server apparatus.

INDUSTRIAL APPLICABILITY

The present disclosure is applicable to a display system, control apparatus, and control program for displaying position information.

REFERENCE SIGNS LIST

10 . . . retail shop, 11 . . . product, 12 . . . display rack, 13 . . . buyer, 14 cash register, 15 . . . imaging apparatus, 16 . . . identification apparatus, 17 . . . entrance, 19 . . . display apparatus, 20 . . . imaging apparatus, 21 . . . communication tag, 22 . . . access point, 23 . . . locator, 24 . . . GPS apparatus, 25 . . . mobile terminal, 50 . . . analysis apparatus, 51 . . . communication apparatus, 52 . . . display apparatus, 53 . . . input apparatus, 60 . . . control apparatus, 61 . . . first position acquisition unit, 62 . . . second position acquisition unit, 63 . . . captured image analysis unit, 64 . . . buyer information acquisition unit, 65 . . . behavior analysis unit, 66 willingness-to-buy calculation unit, 67 . . . hot-selling product analysis unit, 68 . . . reason analysis unit, 69 . . . inventory management unit, 70 . . . analysis result presentation unit, 72 . . . spatial information maintaining unit, 80 . . . storage apparatus, 81 . . . buyer database, 82 . . . spatial information maintaining unit, 83 . . . position information maintaining unit, 100 . . . display control apparatus, 151 . . . communication apparatus, 153 . . . input apparatus, 160 . . . control apparatus, 161 . . . first position acquisition unit, 162 . . . second position acquisition unit, 163 analysis result acquisition unit, 164 . . . spatial information acquisition unit, 165 . . . display position adjustment unit, 166 . . . display range adjustment unit, 167 . . . superimposed display control unit, 168 . . . display switching unit, 180 . . . storage apparatus, 181 . . . buyer database, 182 . . . spatial information maintaining unit, 183 . . . display information maintaining unit

The invention claimed is:

1. A system comprising:
   a processor; and
   a memory storing instructions that, in response to the execution of the instructions by the processor, cause the processor to perform the following operations:
   receive first information relating to a position of a person in a space in which an object is located, the first information including information related to a change in the position of the person between a first point in time and a second point in time different from the first point in time;
   receive second information relating to a position of the object, the second information including information related to a change in the position of the object between the first point in time and the second point in time;
   integrate the first information and the second information;
   superimpose and display the integrated information on a display; and
   display, on the display, a result of analysis obtained by analyzing at least one of the first information or the second information, wherein
   the integrated information comprises information indicating that the person picked up the item when a relative distance from the position of the person to the position of the object has decreased between the first point in time and the second point in time, and indicating that the person returned the item when the distance between the person and the item has increased between the first point in time and the second point in time.

2. The system according to claim 1, wherein
the processor is configured to display an amount of movement, number of times of movement, speed of movement, duration of stay of a person, or an amount of movement, number of times of movement, speed of movement, duration of existence of an object, on the display.

3. The system according to claim 1, wherein
the processor is configured to identify a status, attribute, or behavior of a person by the first apparatus and display relevant information on the display.

4. The system according to claim 1, wherein
the processor is configured to display coordinates or layout of the space, information related to a change in the position of the person, and information related to a change in the position of the object superimposed on one another on the display.

5. The system according to claim 4, wherein
the processor is configured to display information related to the space superimposed on the display.

6. The system according to claim 4, wherein
the processor is configured to switch between ON and OFF by displaying or not displaying at least one of a plurality of items of information superimposed and displayed on the display.

7. The system according to claim 1, wherein
the processor is configured to superimpose and display changes in all items of information obtained on the display simultaneously.

8. The system according to claim 1, wherein
the processor is configured to receive the second information from a communication apparatus that communicates with a plurality of communication tags respectively attached to a plurality of objects.

9. The system according to claim 1, wherein
the processor is configured to receive the first information from an imaging apparatus that captures an image of a person.

10. The system according to claim 1, wherein
the processor is configured to display information related to a change in a position of a buyer, excluding persons other than the buyer.

11. The system according to claim 1, wherein
the second information includes information related to a change in a position of an object picked up by a hand of the person between the first point in time and the second point in time.

12. A non-transitory storage medium storing a control program that causes a computer to perform the following operations:
   receive first information relating to a position of a person in a space in which an object is located, the first information including information related to a change in the position of the person between a first point in time and a second point in time different from the first point of time;
   receive second information relating to a position of the object, the second information including information related to a change in the position of the object between the first point in time and the second point in time;

integrate the first information and the second information;
superimpose and display the integrated information on a display apparatus; and
display, on the display, a result of analysis obtained by analyzing at least one of the first information or the second information, wherein
the integrated information comprises information indicating that the person picked up the item when a relative distance from the position of the person to the position of the object has decreased between the first point in time and the second point in time, and indicating that the person returned the item when the distance between the person and the item has increased between the first point in time and the second point in time.

\* \* \* \* \*